CODED CARD READING AND SELECTING APPARATUS

Filed Oct. 20, 1965 Sheet 1 of 3

INVENTORS
ARCHIE H. HIGGINS
ROBERT W. BONNEMA
MERLE D. TYLER
BY
Sheridan and Ross
ATTORNEYS INVENTORS
ARCHIE H. HIGGINS
ROBERT W. BONNEMA
MERLE D. TYLER
BY
Sheridan and Ross
ATTORNEYS

CODED CARD READING AND SELECTING APPARATUS

INVENTORS
ARCHIE H. HIGGINS
ROBERT W. BONNEMA
MERLE D. TYLER
BY
Sheridan and Ross
ATTORNEYS United States Patent Office 3,437,201

Patented Apr. 8, 1969

3,437,201

CODED CARD READING AND SELECTING APPARATUS

Merle D. Tyler and Robert W. Bonnema, Denver, and Archie H. Higgins, Arvada, Colo., assignors to Uptime Corporation, Golden, Colo., a corporation of Colorado
Filed Oct. 20, 1965, Ser. No. 498,756
Int. Cl. B07c *5/34*
U.S. Cl. 209—110 20 Claims

ABSTRACT OF THE DISCLOSURE

A method and apparatus for sorting within a single card receiving hopper means cards of two or more classifications as said cards are fed successively into said hopper means wherein the stack of cards formed within said hopper includes a uniform stack of cards having a single classification and cards of one or more classifications which are interleaved in said stack but have a portion thereof projecting laterally a short distance from the adjacent contour of said stack, said projecting portions serving as their own indicators of the difference in classification.

This invention lies in the field of coded card reading and selecting apparatus, and is directed particularly to an apparatus of this type which is provided with a single discharge hopper which receives cards of two or more classifications in a single stack in such manner as to distinguish cards of one classification from those of one or more other classifications. More particularly it is directed to mechanism which identifies cards of different classification as they pass through a card reader and builds up a single stack of cards in a discharge hopper with the main body of cards forming a uniform stack of a single classification, while the cards of one or more other classifications are interleaved in the stack but project laterally from the contour thereof a short distance to serve as their own indicators of the difference in classification.

Coded cards are well known and widely used in industry and business for record keeping, computing, machine control, and various other purposes. The most common type are punched cards of stiff opaque paper with each punched hole having code significance for use by a card reading mechanism, which may be actuated by electrical contact or light transmission through the holes. Another type card is made of plastic film which is coded by opaque and transparent areas or by punched holes. Any information bearing medium having coded signals which may be sensed or "read" by one of the many reading and computing machines presently available on the market may be considered as a "card" or "coded card" of the type processed by the mechanism of the present invention.

Most of the machines presently used to process coded cards are provided not only with means to gather and further process information found on the cards but also with means for sorting the cards into separate classifications and discharging them into separate discharge hoppers or storage bins. There is usually a "reject" bin to receive cards which are found to be defective or incorrectly punched or which for any other reason it may be desirable to segregate from the primary deck or decks. These machines are very satisfactory for their intended purpose but, because of the plurality of discharge or storage bins, they must of necessity be rather large and take up considerable space.

There are many card reading operations of a comparatively simple nature which do not require sorting of the discharged cards into a multiplicity of various bins. The majority of cards to be read are of a single classification and may be deposited into a single discharge hopper. The remainder may be of several types, such as defective, incorrect, or unrelated, and they may be discharged together. For such operations, rather compact machines are being used which are provided with a basic discharge hopper and a reject hopper. In order to achieve maximum compactness, it is desirable to eliminate the reject hopper and still retain the function of segregating those cards which differs from the main body of cards in some characteristic way.

The card reading and selecting apparatus embodying the present invention includes a card supply hopper and a card reader which incorporates a control unit. The card reader generally comprises a read head, a timing head, and a computer which receives information from the heads and converts it to the type of information which the operator desires to obtain. The computer may store some or all of the information and may use it to emit signals for various purposes. The control unit referred to herein is a part of the computer which identifies a distinction between some of the cards being processed and sends a reject or selection signal resulting in a segregation of certain of the cards.

A transport channel extends through the reader and a transport drive picks cards successively from the stack or deck in the input hopper and passes them to and through the transport channel for reading and subsequent discharge. From the discharge end of the channel a guide path is formed to direct and feed the cards successively to a single discharge hopper which includes a bottom wall, at least one side wall, and an end plate. The latter is in substantially the same plane as the plane of the advancing cards, and each successive card is fed into the hopper in a position between the guide plate and the next preceding card and in flat facewise engagement with both. The majority of the cards are fed into the hopper to a substantially identical final position against the side wall of the hopper which is adjacent to that end of the end plate remote from the point of entrance into the hopper. Thus the succession of cards builds up a substantially uniform stack.

Segregation of selected or "rejected" cards while incorporating them into the single discharge stack is accomplished by modifying the final portion of their path of travel to cause them to assume final positions in the stack offset from the final positions of the main body of cards. For purposes of illustratoin, assuming the cards to be so stacked in the hopper that each card is in a plane perpendicular to the bottom wall of the hopper and with one of its long edges resting on the bottom wall, a segregated card may have a final position in which it is offset upwardly so that its upper margin is above the contour of the stack, or longitudinally so that its side margin extends beyond the contour of the stack, or it may be skewed so that portions of its margins protrude vertically and horizontally beyond the contour of the stack at an acute angle. In any of the positions the card is positively segregated and serves as its own index tab to indicate its distinction or difference in classification from the main body of cards.

The presently preferred system for elevating a selected card in its own plane to a position above the main body of cards, preferably a distance of the order of one half inch, comprises a pair of rollers forming a portion of the guide path between the discharge from the card reader and the entrance to the hopper. The drive roller is mounted for rotation on a fixed axis perpendicular to the plane of the bottom wall of the hopper. The idler roller is mounted on a bracket for rotation about an axis which, in neutral position, is parallel to the axis of the drive roller, and the bracket in turn is mounted on a support for rotating about the axis which is perpendicular to the plane of the passing cards and substantially intersects the axis of the drive roller. A solenoid and suitable linkage are provided to rotate the bracket a few degrees away from neutral position and spring means are provided to return it to neutral position.

For best results, the drive roller has a hard smooth surface and the idler roller is substantially larger in diameter and has a yieldable surface of a material such as polyurethane having a coefficient of friction substantially greater than that of the drive roller. The two rollers are in slight interference contact in the plane of the advancing cards which pass between them and into the dsicharge hopper. When the idler roller is in neutral position, each succeeding card is fed into the hopper directly along the longitudinal axis of its principal path of movement. When the solenoid is operated in response to a signal from the control unit, the bracket is rotated so that the axis of the idler roller is at an acute angle to the of the driver roller.

When the selected card now passes between the rollers, the frictional contact of the idler roller exerts an upward lateral force on each portion of the card and thus moves the entire card laterally upward and away from its principal path of movement. The angle of the idler roller is so selected that when the card reaches its final position in the stack it will be offset the desired distance, one half inch being sufficient for index purposes. The control unit is so programmed that the solenoid will be actuated just long enough to cause offsetting of the full length of the selected card, after which the spring means returns the idler roller to neutral position.

A modified form of lateral offsetting mechanism comprises a ramp member which has a neutral position just outside of the end plate. When actuated, it passes through a suitable opening in the end plate into contact with the last stacked card and into a position of interference with the advancing selected card. The ramp member has a sloping portion which engages the bottom forward edge of the advancing card and guides the entire card laterally upward to a final position above the contour of the basic stack. The ramp member may be formed with the major part of its active surface parallel to the hopper bottom wall or the entire surface may be a continuous gradual slope.

A mechanism for offsetting a selected card so that it protrudes from a side wall of the stack comprises a detent member which is moved laterally into contact with the last stacked card through a gap between the side wall and end plate or through a suitable opening in the end plate a short distance from the side wall. When the detent is so moved in response to a control signal it blocks the progress of the selected card just short of the normal final position so that it will remain protruding as described above.

Any of the three mechanisms described above may be used for segregating all selected cards in the same way from the main body. However, the last described mechanism may also be used in conjunction with either of the other two when it is desired to separate the reject cards in two distinct groups. When two different mechanisms are so used the control unit is, of course, programmed to actuate them selectively to achieve the desired result.

Various other advantages and features of novelty will become apparent as the description proceeds in conjunction with the accompanying drawings, in which.

Figures 1, 2, 7:
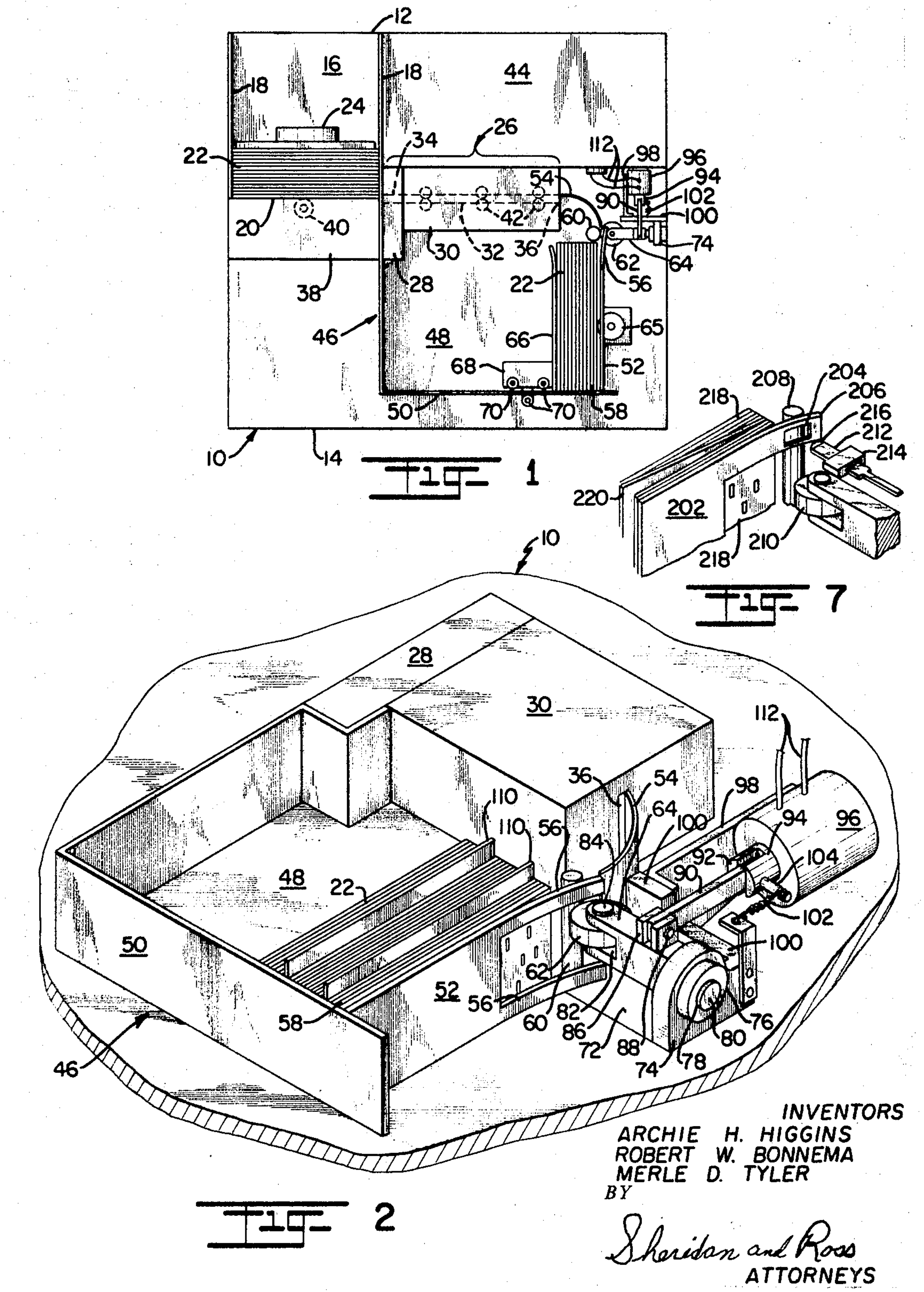
FIG. 1 is a schematic plan view of a card reading and selecting mechanism incorporating the preferred form of the invention.
FIGURE 2 is an enlarged perspective view of a portion of the mechanism of FIGURE 1, further showing the relation of certain essential elements.
FIGURE 7 is a perspective view of a modified form of the mechanism shown in FIGURE 2.

The general combination of arrangement of parts are illustrated in FIGURE 1 in which, for exemplary purposes only, the card reading and selecting apparatus is mounted on a flat panel 10 which may be mounted on a base at any convenient angle with edge 12 at the same level or a higher level than edge 14. At the upper left hand corner is provided a card supply hopper 16 having side walls 18 and a bottom wall 20, containing a supply of coded cards 22 adapted to pass through the reader and into a discharge hopper. To maintain the cards in the proper compact relation a weight or force 24 is provided in loose sliding relation in the hopper.

Card reader 26 includes a read head 28 and a timing head 30 of known type and construction traversed by a transport channel 32 through which the cards pass from entrance 34 to exit 36. The transport drive comprises a picker actuating means 38 having a suitably powered picking roller 40 and several sets of suitably powered transport picker rollers 42 in the card reader. Roller 40, in known manner, picks one card at a time from the stack or deck of cards 22 and passes them successively into reader 26 where rollers 42 move them onwardly and through exit 36. Unit 44 is a computer or information processer which receives signals from heads 28 and 30 representative of the coded information on each card and processes them in any manner desired. This may include recording of the computed information, visual readout, control signals to operate external devices, and a control unit to send appropriate signals to the card offsetting mechanism.

Card hopper 46 includes a bottom wall 48, side wall 50, and end plate 52. The latter is substantially in line with the free end of curved guide fence 54 which forms the major part of the guide path from exit 36 to the entrance to the hopper. The free end 56 of the end plate 52 is curved slightly away from fence 54 to avert any possibility of the leading edge of a card striking it and causing a jam. It also provides a divergent opening to receive each successive card between the end plate and the next preceding card so that it will slide readily into place and gradually build up a uniform stack 58 of processed cards. The guide path is completed by drive roller 60, suitably driven by a motor not shown, and idler roller 62 rotatably mounted on bracket 64 in juxtaposition to roller 60. Roller 60 rotates about a fixed upright axis perpendicular to the bottom wall 48 of the hopper. Roller 62, in the neutral position shown in FIGURES 1 and 2, rotates about an axis parallel to that of roller 60.

If desired, a further roller 65 may be provided. It has a hard smooth surface and projects slightly through an aperture in the end plate to contact the last stacked card and hold it slightly away from the end plate, while providing friction drive into hopper 46 providing easier entry for the succeeding card. The cards are snugly maintained in properly compressed relation to keep the stack uniform by a compression plate 66 provided with a weight 68. The combination is mounted by a series of rollers 70 to glide along the length of side wall 50. If the hopper is inclined, the weight will apply the necessary force. If the hopper is substantially horizontal, a supplemental vertically moving weight, not shown, may be connected to weight 68 by a cable and pulley to provide the necessary force.

Figure 3:
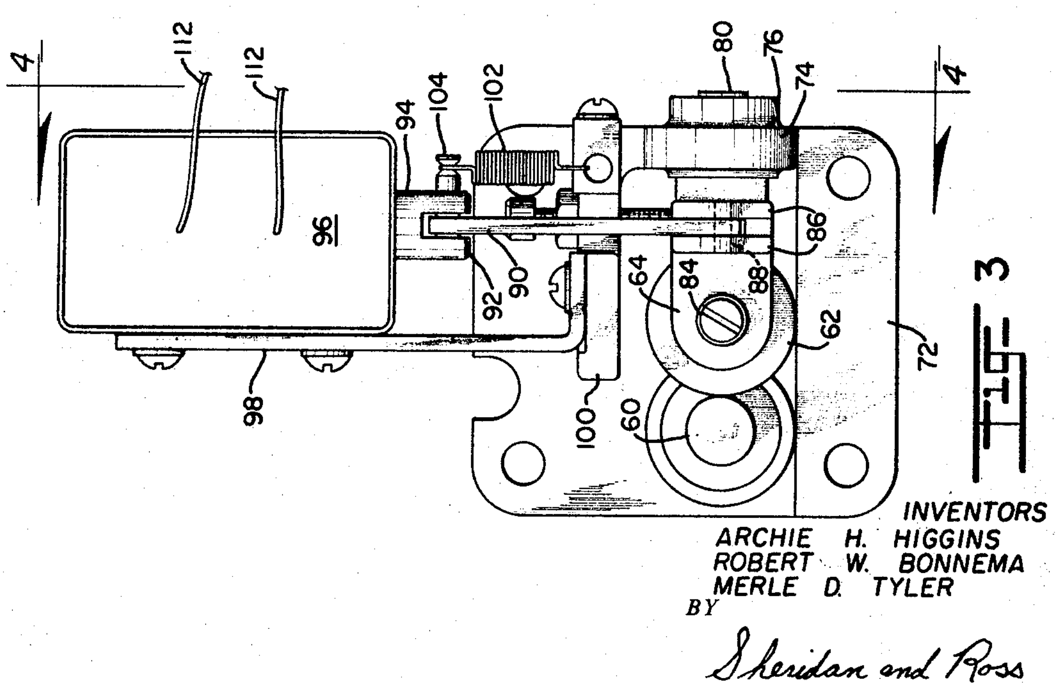
FIGURE 3 is an enlarged plan view of the rollers and actuating mechanism of FIGURE 2.

With roller 62 in the neutral position shown in FIGS. 1 and 2, each advancing card passes directly between rollers 60 and 62 on the longitudinal axis of its principal path of movement and moves into its final position at the bottom of the stack as shown in FIG. 1 with its margins in alignment with the contour of the stack. The mechanism shown in detail in FIGS. 2, 3, and 4 is adapted to modify the final portion of the movement of any selected card by offsetting it a short distance laterally in its own plane while the card still travels bodily in a direction parallel to its normal or principal axis of motion.

The mechanism includes a base or support 72 having a flat surface which may lie flush with the upper surface of panel 10. The support has an upstanding end wall 74 enlarged to form a boss 76 which is apertured at 78 to rotatably receive a shaft 80. The latter is a continuation of bracket 64 and its axis is aligned perpendicular to the plane of travel of the cards and substantially intersects the axis of roller 60. Bracket 64 at its free end is formed with a fork 82 to receive roller 62 and the latter is rotatably mounted therein by pivot shaft 84. A second fork 86 extends upwardly from bracket 64 and carries a pivot shaft 88 to which is pivotally connected one end of link 90.

The other end of the link is pivotally connected to the free end 92 of armature 94 of solenoid 96. The solenoid is carried by a bracket 98 which in turn is secured to wall 100 of support 72. A tension spring 102 is connected at one end to wall 100 and at the other end to the extended portion of pivot shaft 104. In operation, the solenoid retracts armature 94 on actuation to rotate bracket 64 through an angle of a few degrees by virtue of its connection to link 90 and fork 86. When the solenoid is deactuated, the force of spring 102 again extends the armature and returns the bracket 64 to neutral position. Roller 60 is actually a long shaft journaled in bearings 106 in boss 108.

Figure 4:
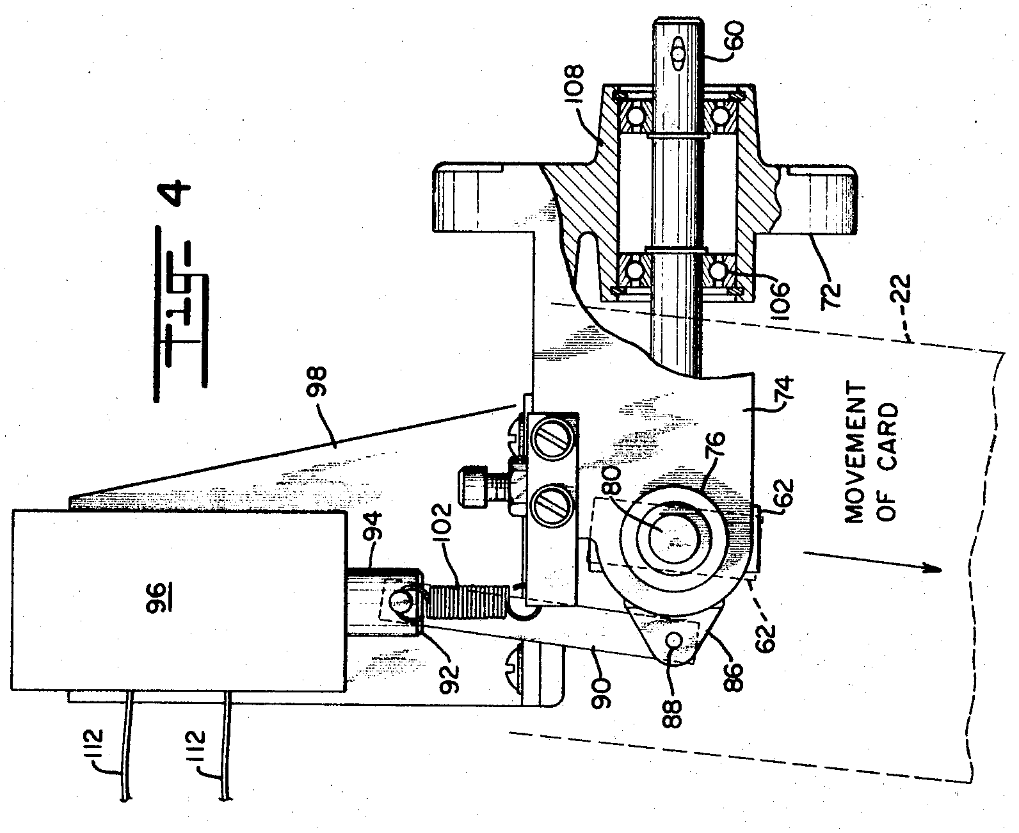
FIGURE 4 is a side elevational view taken on line 4—4 of FIGURE 3.

By reference to FIG. 4 it will be seen that with the bracket 64 in neutral position, roller 62 shown in solid lines has its axis of rotation parallel to the axis of roller 60 and there will be no lateral force exerted on cards passing between the rollers. However, when the solenoid is actuated and bracket 64 is angularly displaced, the axis of roller 62 is also angularly displaced so that it has the attitude shown in dotted lines. It will now exert a force in a direction to the left as viewed in FIG. 4. Since roller 60 is hard and smooth and roller 62 is yieldable and has a relatively high coefficient of friction, the card will slip on roller 60 and travel in the general direction indicated by the broken lines. It is to be noted that the lateral force is applied to successive portions of the advancing card so that all portions are moved laterally the same amount and when the card has reached its final position its upper margin will be parallel to but displaced above the main body of cards in the stack as indicated at 110 in FIG. 2. Solenoid 96 is provided with a pair of conductors 112 to receive the appropriate actuation signal from the control unit in computer 44, which determines the moment of initiation and the duration of the signal to process the selected card at the proper time and for the necessary length of time.

Figure 5:
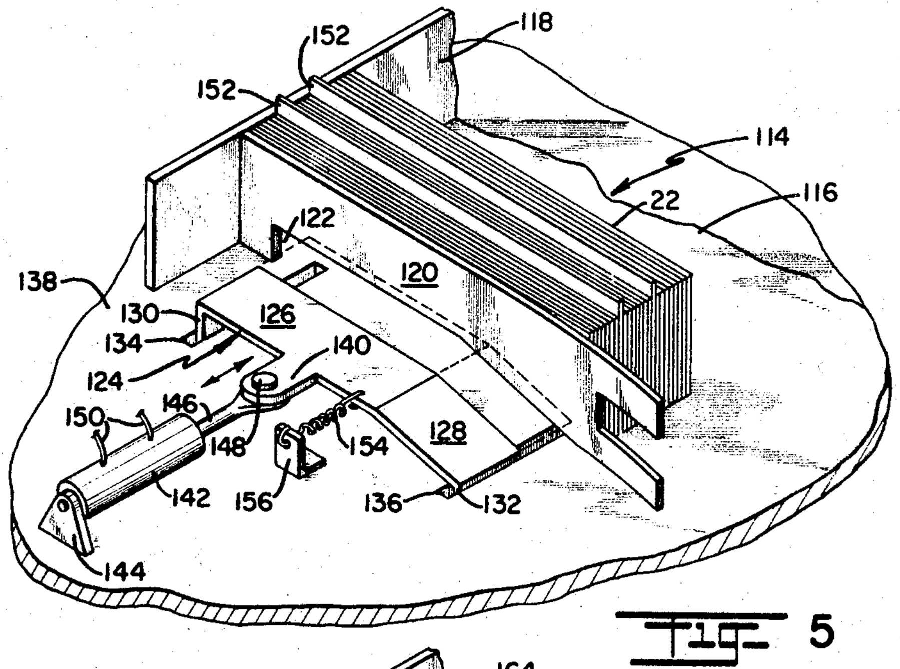
FIGURE 5 is a perspective view of a modified form of the invention.

A modified form of device to laterally offset selected cards is illustrated in FIG. 5. In this figure, the discharge hopper 114 includes a bottom wall 116, a side wall 118, and an end plate 120. In this form the bottom portion of the end plate is cut away as indicated at 122 to provide clearance for lateral movement of a ramp member 124. The latter comprises an elongated flat plate portion 126 parallel to and spaced above the bottom wall 116 of the hopper and an inclined extension portion 128 integral therewith. The extension portion continues down to a level even with or slightly below the level of the bottom wall 116. At each end of the ramp member, downwardly extending flanges 130, 132 extend through slots 134, 136 cut in panel 138 and have end portions, not shown, sliding on guide members, not shown, to provide lateral movement toward and away from the stack of cards.

Ramp portion 126 has an integral tab 140 about midway of the total length of the ramp member. A solenoid 142 mounted to the panel by bracket 144 has an armature 146 connected to the tab at 148. Conductors 150 lead to the control unit of the computer to carry the appropriate signals for actuation of the solenoid. When the solenod is actuated it drives ramp member 124 toward the card stack until the flanges strike stops, not shown. At this time the ramp member is in the dotted line position and its inner margin is just touching the last stacked card. Consequently, it is in an interference position with respect to the next advancing card which has been selected by the computer for offset stacking. When the card arrives from the right as viewed in FIG. 5 it begins to enter the stack and then its lower forward corner encounters the inclined ramp portion 128. This causes the card to rise as it advances and it proceeds until its leading edge strikes the side wall 118, at which time it assumes the attitude of cards 152 generally parallel to but above the level of the other cards in the stack. When the solenoid is de-actuated, spring 154 connected at one end to portion 126 and at the other end to bracket 156 retracts the ramp member to non-interfering position. If desired, the ramp member may have a continuous incline from end to end, in which case the segregated cards will have a final position in which their margins extend angularly from both the upper and side edges of the basic stack.

Figure 6:
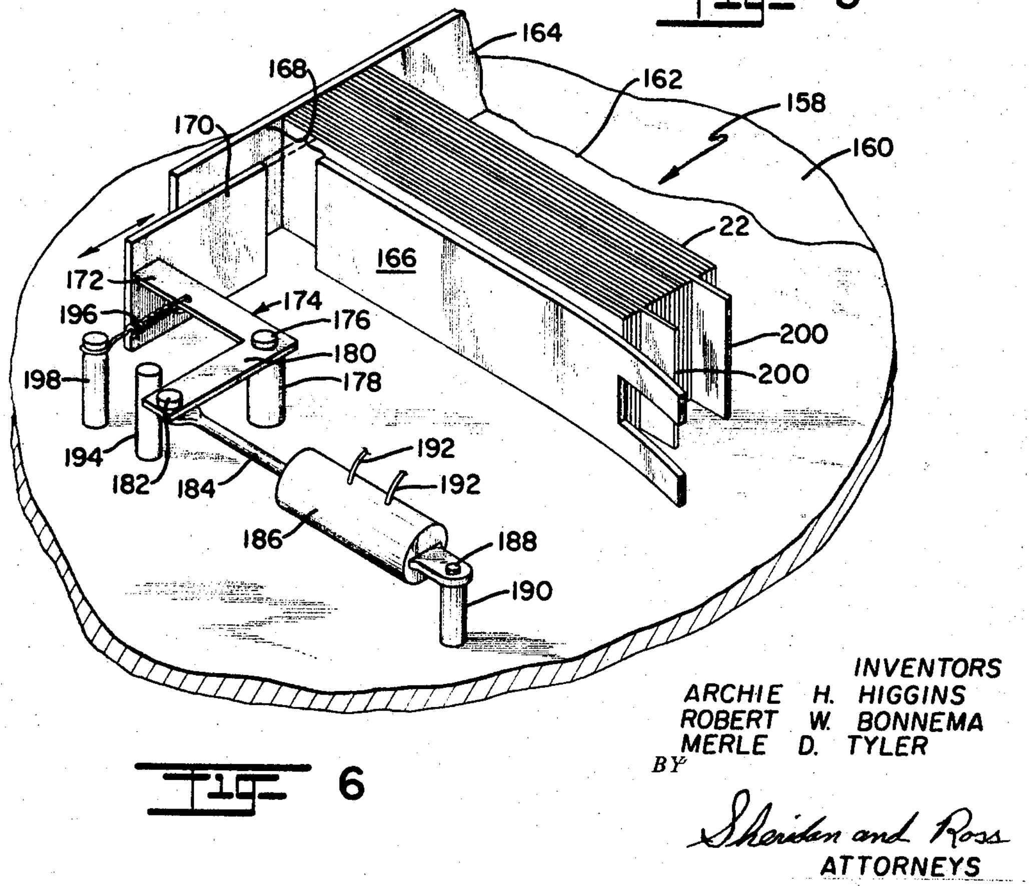
FIGURE 6 is a perspective view of a further modified form of the invention.

A further modification of the invention is illustrated in FIG. 6 in which the cards are offset to the side of the stack rather than the upper margin. In this form, the hopper 158, carried by panel 160, includes bottom wall 162, side wall 164, and end plate 166. The latter stops short of the side wall, leaving a gap 168. A detent 170, which may take any suitable form but is here shown as a flat plate, is rigidly mounted at the end 172 of bell crank 174 which is pivotally mounted at 176 on post 178 carried by the panel. End 180 of the bell crank is pivotally connected at 182 to the armature 184 of solenoid 186, which in turn is pivotally connected at 188 to post 190. Conductors 192 are connected to the control unit of the computer to carry the appropriate signals for solenoid actuation.

Extension of the solenoid armature causes clockwise rotation of the bell crank, which is limited by contact of arm 180 with post 194. Spring 196, connected to arm 172 and to post 198, causes retraction of the armature and counter-clockwise rotation of the bell crank. When the solenoid is actuated by the control signal, bell crank 174 turns clockwise and detent 170 advances substantially in a straight line to the dotted line position, where it is halted by contact of arm 180 with post 194. In this position, it has passed through gap 168 and contacted the last stacked card and is in firm engagement with its adjacent face. When the selected card enters the hopper, its leading edge strikes detent 170 and it is stopped short of its normal final position by a short distance, preferably of the order of one half inch. At the end of the signal duration the detent is retracted by the action of spring 196, and subsequent cards again reach their normal final position until the next signal is received by the solenoid. Those cards which have been stopped short extend out from the side margin of the stack as indicated at 200.

In FIGURE 7 is shown a modification of the mechanism depicted in FIGURE 2. In FIGURE 7 an end plate 202 similar to end plate 52 of FIGURE 2 has been modified to the extent that an opening or aperture 204 has been formed through the upper portion 206 of one of the free ends thereof. A drive roller 208 similar to drive roller 60 and a fixed idler roller 210 is disposed at the entry of the hopper in which the cards are to be disposed. A translatably mounted member 212 is disposed above the idler roller 210 and opposite the aperture 204. Member 212 is positioned within a guide-support member 214 as shown. The end 216 of member 212 has a material such as polyurethane foam mounted thereon which has a relatively large coefficient of friction. The member 212 is actuated by any suitable means such as a solenoid (not shown).

With the member 212 in its retracted position as shown in FIGURE 7, the cards 218 enter the hopper and are disposed therein in the customary manner. However, upon actuation of member 212, member 212 moves toward end plate 202 until the end 216 thereof extends through the aperture 204 whereby same will be disposed in contacting engagement with a card that passes between the roller 208 and portion 206 of end plate 202. Contacting of a card in this manner results in the application of a drag along the upper portion of the card thereby causing same to pivot or turn about the point of such contact whereby the card travels in an upwardly direction and is offset with respect to the remaining cards in the hopper. Card 220 is a card which has been offset in the manner as described. Thus, it will be readily appreciated that an offsetting or indexing of cards may be easily accomplished with the device shown in FIGURE 7.

In most cases only one of the forms shown is used in one card reading and selecting mechanism. However, when it is desired to segregate two distinct classifications of cards from a first basic classification, the device of FIGURE 6 is used together with either of the devices of FIGURE 2 and FIGURE 5. In this way, the main body of cards in the basic uniform stack represents a first classification, those which extend from one margin of the stack represent a second classification, and those which extend from the other margin represent a third classification. In this case the computer is programmed to emit different signals for each of the offsetting mechanisms.

The system described above operates most satisfactorily when the cards are transported in the direction of their longitudinal axes. However, it will operate in the same way when the cards are transported in the direction of their lateral axes. The cards need not be of the proportions indicated as the system is applied in the same way to other proportions including square cards.

The invention is illustrated with the discharge hopper lying in or near a horizontal position. However, this is not a limiting factor, and the system will operate as disclosed in any attitude or arrangement in which the cards are retained in a compact stack in the discharge hopper by gravity or supplementary means.

While systems of this kind are used largely for the purpose of separating out unwanted cards it is clear that it is equally adapted to select a small group of desired cards without computing or recording information from the others.

It will be apparent to those skilled in the art that various changes and modifications may be made in the construction and arrangement of parts as disclosed without departing from the spirit of the invention, and it is intended that all such changes and modifications shall be embraced within the scope of the following claims.

We claim:

1. A coded card reading and selecting apparatus comprising: a card supply hopper; a card reader incorporating a control unit and provided with a transport channel; a transport drive to remove cards from said supply hopper and transport them successively to and through said card reader; a discharge hopper; transfer means to receive said cards successively from said reader and feed them to said discharge hopper and store them therein in a uniform stack; and offset means actuated by a signal from the control unit to physically offset selected cards from the main body of cards in the stack.

2. Apparatus as claimed in claim 1; said offset means acting to displace selected cards in their own plane laterally of the principal direction of their path of travel.

3. Apparatus as claimed in claim 1; said offset means acting to stop the travel of selected cards short of their normal final position.

4. Card transfer and storage means for use with a card reader incorporating a control unit, comprising: a discharge hopper having a bottom wall and at least one side wall and an end plate; transfer means to receive discharged cards from said reader and feed them successively into said discharge hopper adjacent to said end plate to cause each card to lie between said end plate and the next preceding card and with its leading edge substantially in contact with said side wall to produce a uniform stack; and offset means actuated by a signal from the control unit to physically offset selected cards from the main body of cards in the stack.

5. Apparatus as claimed in claim 4; said offset means acting to displace selected cards laterally away from said bottom wall.

6. Apparatus as claimed in claim 4; said offset means acting to stop the travel of selected cards short of contact with said side wall.

7. Card transfer and storage means for use with a card reader, comprising: a discharge hopper; transfer means to receive discharge cards from said reader and feed them successively to substantially identical final positions in said hopper with each succeeding card lying in flat facewise engagement with the preceding card to form a uniform stack; and offset means to modify the final portion of hte path of travel of selected cards to cause them to assume final positions in said stack offset from the final positions of the main body of cards in said stack to serve a signal of difference in classification.

8. Apparatus as claimed in claim 7; said offset means comprising a member adapted to contact a selected card and deflect it in its own plane laterally of the principal direction of its path of travel while the card continues to travel substantially in said principal direction.

9. Apparatus as clamed in claim 8; said offset means comprising an idler roller mounted in juxtaposition to a drive roller of said transfer means to provide a path of travel between said rollers for discharged cards; the axis of rotation of said roller lying in a plane parallel to the plane of the passing cards; and means to set said axis in said plane at an angle to the axis of travel of said cards other than 90 degrees; the contact of said angularly displaced idler roller exerting a lateral displacing force on the selected card during its passage.

10. Apparatus as claimed in claim 9; said drive roller having a smooth contact surface with a low coefficient of friction; said idler roller having a contact surface with a substantially higher coefficient of friction.

11. Apparatus as claimed in claim 8; said offset means comprising a ramp member insertable into the path of movement of a selected card; said ramp member having an inclined surface to contact a side edge of an advancing card and guide the card in its own plane laterally of its principal path of movement.

12. Apparatus as claimed in claim 11; said ramp member having a flat exposed surface lying in a plane which is at right angles to the plane of an advancing card and which passes between the longitudinal margins of said card and having a continuation of said surface sloping to a point outside the margin of said card; guide means for said ramp member; said ramp member being movable on said guide means in a direction substantially at right angles to the path of movement of said card between non-interfering and interfering positions; and actuating means to move sad ramp member between said positions.

13. Apparatus as claimed in claim 7; said offset means comprising a detent movable from a non-interfering position to an interfering position in the path of movement of a selected card to engage the leadng edge of said card and block the card from reaching its normal final position.

14. Apparatus as claimed in claim 13; said detent comprising a flat plate lying in a plane at right angles to the plane of an advancing card and at right angles to its path of movement and having a free edge parallel to the plane of said card; said free edge being movable to engage the face of the next preceding card to block passage of the advancing card.

15. Card transfer and storage means for use with a card reader, comprising: a discharge hopper having a bottom wall and at least one side wall and an end plate; said end plate being substantially perpendicular to said bottom wall and side wall; a drive roller and an idler roller mounted adjacent the free end of said end plate opposite to said side wall; said drive roller having a fixed axis of rotation parallel to the plane of said end plate and normal to the plane of said bottom wall; a fixed bracket support; a bracket mounted on said support for rotation about an axis normal to the plane of said end plate and passing substantially through the axis of said drive roller; said idler roller being mounted on said bracket for rotation about an axis normal to the axis of rotation of the bracket; said bracket having a neutral position in which the axis of rotation of said idler roller is parallel to the axis of said drive roller; said rollers being in juxtaposition to form a portion of a guide path between the card reader and the discharge hopper and substantially coplanar with said end plate, and serving to guide successive cards into substantially identical final positions in said hopper between said end plate and the next preceding card to produce a uniform stack; said bracket having an angularly displaced position in which the axis of the idler roller is at an acute angle to the axis of the drive roller and the contact of the idler roller with a passing card urges it laterally away from its primary path of travel; and means to move said bracket from its neutral position to its angularly displaced position at times to deflect selected cards from their primary path of travel.

16. Apparatus as claimed in claim 15; including a lever arm fixed to said bracket; a solenoid; and a force transmitting link connecting said solenoid to said lever arm; said solenoid being actuated in response to a signal from the card reader to offset a selected card.

17. Card receiving apparatus, comprising hopper means for supporting a stack of cards in face-to-face relationship, feeding means operative to feed cards successively into the hopper means so as to form a stack of cards, and offsetting means operative to interfere with the feeding movement of predetermined ones of the cards so that the faces of the predetermined cards are displaced in an edgewise direction in relation to the faces of the remainder of the cards in the stack.

18. Cards sorting apparatus, comprising hopper means for supporting a stack of cards in face-to-face relationship, feeding means operative to feed cards successively into the hopper means so as to form a stack of cards, and offetting mean selectively operable when the cards are being fed into the hopper means to give predetermined ones of the cards a component of motion in a direction transverse to the direction of feeding of the cards so that the predetermined cards are displaced edgewise in relation to the remainder of cards in the stack.

19. Card sorting apparatus, comprising hopper means supporting a stack of cards in face-to-face relationship, feeding means operative to feed cards successively into the hopper means so as to form a stack of cards, and offsetting means selectively operable while the card are being fed to the hopper means to interfere with the feeding movment of predetermined cards whereby the predetermined cards are displaced edgewise in one or other of two predetermined directions, mutually transverse, relative to the remainder of cards in the stack.

20. A method of sorting cards into at least first and second classifications comprising the steps of:

successively feeding cards of said first and second classification from a card reader so as to produce a stack in which said cards are in facewise contact with each other and the cards of said first classification have the edges thereof in substantial alignment; and displacing the cards of said seconrd classification as they are fed into said stack so that a marginal portion of each card of said second classification extends beyond the aligned corresponding edges of the cards of said first classification.

No references cited.

DARYL W. COOK, *Primary Examiner.*

Disclaimer 3,437,201.—*Merle D. Tyler* and *Robert W. Bonnema*, Denver, and *Archie H. Higgins*, Arvada, Colo. CODED CARD READING AND SELECTING APPARATUS. Patent dated Apr. 8, 1969. Disclaimer filed Nov. 3, 1970, by the assignee, *Uptime Corporation.*

Hereby enters this disclaimer to claims 1, 2, 7, 8, 17, 18, 19 and 20 of said patent.

[*Official Gazette December 8, 1970.*]